United States Patent
Vemulapati et al.

(10) Patent No.: US 10,766,413 B1
(45) Date of Patent: Sep. 8, 2020

(54) VEHICLE LIGHTING SYSTEM, LIGHT GUIDE, AND METHOD OF MAKING THEREOF

(71) Applicant: Ford Global Technologies, LLC, Dearborn, MI (US)

(72) Inventors: Satyanarayana R. Vemulapati, Westland, MI (US); Steven J. Antilla, Brighton, MI (US); Jason Robert Emrich, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/668,392

(22) Filed: Oct. 30, 2019

(51) Int. Cl.
  *B60Q 1/00* (2006.01)
  *B60Q 3/53* (2017.01)
  *B60Q 3/12* (2017.01)
  *B60Q 3/20* (2017.01)
  *F21V 7/04* (2006.01)

(52) U.S. Cl.
  CPC .................. *B60Q 3/53* (2017.02); *B60Q 3/12* (2017.02); *B60Q 3/20* (2017.02); *F21V 7/04* (2013.01); *F21V 7/043* (2013.01)

(58) Field of Classification Search
  CPC .................................. F21V 7/04; F21V 7/043
  USPC ......................................... 362/615, 623, 487
  See application file for complete search history.

(56) References Cited

U.S. PATENT DOCUMENTS

| | | | |
|---|---|---|---|
| 5,631,994 A * | 5/1997 | Appeldorn | G02B 6/001 385/147 |
| 7,671,859 B2 | 3/2010 | Birman et al. | |
| 8,033,706 B1 * | 10/2011 | Kelly | G02B 6/0036 362/307 |
| 8,928,021 B1 | 1/2015 | Bibl et al. | |
| 9,223,087 B2 | 12/2015 | Cok et al. | |
| 10,288,800 B1 * | 5/2019 | Keranen | H05K 1/0274 |
| 2008/0265181 A1 | 10/2008 | Boe | |
| 2011/0002138 A1 | 1/2011 | Hayes et al. | |

FOREIGN PATENT DOCUMENTS

JP   WO2017090249 A1   9/2018

* cited by examiner

*Primary Examiner* — Thuy Vinh Tran
(74) *Attorney, Agent, or Firm* — David Coppiellie; Price Heneveld LLP

(57) ABSTRACT

A light guide for a light system of a vehicle and a method of forming the light guide are disclosed herein. The light system comprises the light guide, a light source proximate the guide, and a receiving feature coupled to the vehicle. The light guide comprises a core portion having a light transmissive body, a reflective portion, an absorptive portion, and an attachment feature. The reflective portion is disposed about the core portion along the length of the body. The absorptive portion is disposed about the reflective portion along the length of the reflective portion. The attachment feature extends outwardly from the absorptive portion and is configured to be engaged with the receiving feature coupled to the vehicle.

20 Claims, 5 Drawing Sheets

US 10,766,413 B1

VEHICLE LIGHTING SYSTEM, LIGHT GUIDE, AND METHOD OF MAKING THEREOF

FIELD OF THE DISCLOSURE

The present disclosure generally relates to a lighting system for a vehicle. More specifically, the present disclosure relates to a light guide for a vehicle that includes a core portion, a reflective portion, and an absorptive portion.

BACKGROUND OF THE DISCLOSURE

Vehicle lighting systems often use light pipes to transmit light in a desired direction. However, light being transmitted through the light pipes often escape from the light pipes in undesired directions. The escaped light may illuminate portions of the vehicles that are not intended to be illuminated. An improved light pipe may be desired.

SUMMARY OF THE DISCLOSURE

According to a first aspect of the present disclosure, a light guide for a vehicle is disclosed. The light guide includes a core portion having a light transmissive body, a reflective portion disposed about the core portion along the length of the body, and an absorptive portion disposed about the reflective portion along the length of the reflective portion. An attachment feature extends outwardly from the absorptive portion and is configured to be engaged with a corresponding receiving feature of the vehicle.

Embodiments of the first aspect of the present disclosure can include any one or a combination of the following features:
  the reflective portion is configured to reflect light to a greater degree than the absorptive portion, and the absorptive portion is configured to absorb light to a greater degree than the reflective portion;
  the reflective portion is contiguous with the core portion, and the absorptive portion is contiguous with the reflective portion;
  the core portion is fixedly coupled to the reflective portion and the absorptive portion is fixedly coupled to the reflective portion via integral forming of the core portion, the reflective portion, and the absorptive portion;
  the attachment feature is integrally coupled with the absorptive portion, such that the absorptive portion and the attachment feature are a single unitary body;
  the core portion is translucent;
  the absorptive portion is substantially opaque; and
  the reflective portion is generally white and the absorptive portion is generally black.

According to a second aspect of the present disclosure, a lighting system for a vehicle includes a light guide. The light guide includes a core portion that is light transmissive, a reflective portion disposed about the core portion, and an absorptive portion disposed about the reflective portion. The absorptive portion defines an attachment feature. A light source is proximate to the light guide and is configured to emit light through the core portion. A receiving feature is coupled to the vehicle. The reflective portion is configured to reflect the light emitted by the light source. The absorptive portion is configured to absorb light transmitted from the light source through the reflective portion. The attachment feature is configured to be engaged with the receiving feature.

Embodiments of the second aspect of the disclosure can include any one or a combination of the following features:
  the reflective portion is contiguous with the core portion, and the absorptive portion is contiguous with the reflective portion;
  the core portion is fixedly coupled to the reflective portion and the absorptive portion is fixedly coupled to the reflective portion via integral forming of the core portion, the reflective portion, and the absorptive portion;
  the attachment feature is integrally coupled with the absorptive portion, such that the absorptive portion and the attachment feature are a single unitary body;
  the core portion of the light guide has an elongated body that extends between a first end and a second end, and the light source is proximate to the first end;
  the light source emits light into the first end of the core portion, such that the emitted light is transmitted through the elongated body of the core portion and out of the second end;
  the reflective portion extends along an outer periphery of the elongated body of the core portion from the first end to the second end of the core portion; and
  the absorptive portion extends along an outer periphery of the reflective portion generally from the first end to the second end of the core portion.

According to a third aspect of the present disclosure, a method of forming a light guide for the vehicle includes the step of forming a light transmissive core portion having an outer periphery. The method further includes the steps of forming a reflective portion about a length of the core portion, the reflective portion having an inner periphery and an outer periphery, and forming an absorptive portion about a length of the reflective portion, the absorptive portion having an inner periphery and an outer periphery, the outer periphery of the absorptive portion defining an attachment feature configured to be engaged with a corresponding receiving feature of the vehicle.

Embodiments of the third aspect of the present disclosure can include any one or combination of the following steps;
  the core portion, the reflective portion, and the absorptive portion are integrally formed with one another in a single process having multiple sequences;
  solidifying the core portion, the reflective portion, and the absorptive portion via substantially simultaneous cooling; and
  the inner periphery of the reflective portion is contiguous with the outer periphery of the core portion, the outer periphery of the reflective portion is contiguous with the inner periphery of the absorptive portion.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
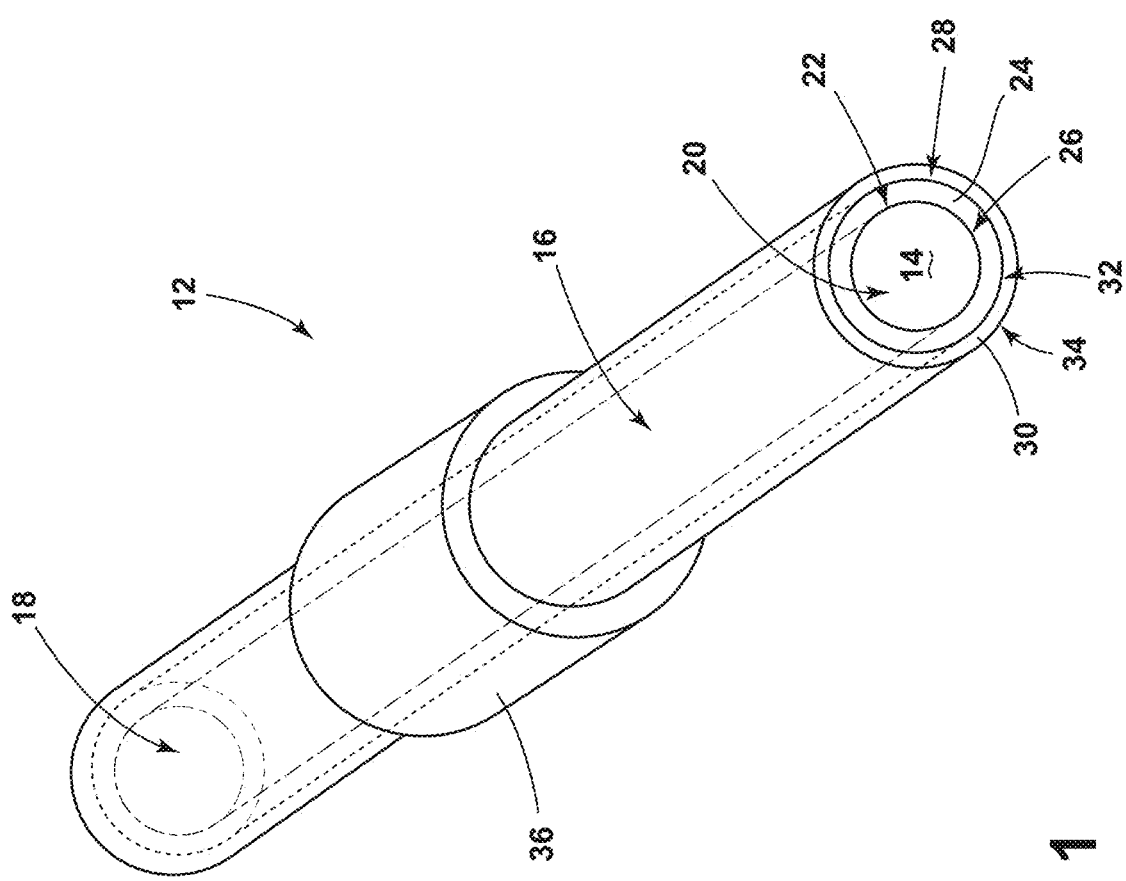
FIG. 1 is a perspective view of a light guide, illustrating a core portion and a reflective portion disposed about the core portion in phantom, as well as an absorptive portion disposed about the reflective portion and defining an attachment feature, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, a lighting system 10 for a vehicle 40 is disclosed. The lighting system 10 includes a light guide 12. The light guide 12 includes a core portion 14 that is light transmissive. A reflective portion 24 is disposed about the core portion 14. An absorptive portion 30 is disposed about the reflective portion 24 and defines an attachment feature 36. A light source 8 is disposed proximate to the light guide 12 and is configured to emit light through the core portion 14 of the light guide 12. A receiving feature 42 is coupled to the vehicle 40. The reflective portion 24 of the light guide 12 is configured to reflect the light emitted by the light source 8. The absorptive portion 30 is configured to absorb light transmitted from the light source 8 through the reflective portion 24. The attachment feature 36 is configured to be engaged with the receiving feature 42 of the vehicle 40.

Referring now to FIG. 1, the light guide 12 is depicted. As shown in FIG. 1, the light guide 12 includes a core portion 14. The core portion 14 may be an optical grade light pipe, which is a substantially translucent pipe suitable for transmitting light as emitted from the light source 8, as further described below. The core portion 14 includes a body 16 that extends between a first end 18 and a second end 20. In various embodiments, the body 16 may be elongated, extending from the first end 18 to the second end 20. The body 16 includes an outer periphery 22. The core portion 14 may be generally formed from a material which may be a rigid material that is comprised of a curable substrate, such as a polymerizable compound, a mold in clear (MIC) material, and/or mixtures thereof. Acrylates may also be used for forming the core portion 14, as well as poly (methyl methacrylate) (PMMA) which is a known substitute for glass. A polycarbonate material may also be used in an injection molding process to form the core portion 14. It is contemplated that in some embodiments, the core portion 14 may be a flexible light pipe, wherein a suitable flexible material is used to create the core portion 14 (e.g., urethanes, silicone, thermoplastic polyurethane (TPU), or other like optical grade flexible materials). Whether the core portion 14 is a flexible light pipe or a rigid light pipe, the core portion 14, when formed, is substantially optically transparent and capable of transmitting visible light.

Referring further to FIG. 1, the light guide 12 includes the reflective portion 24. As shown in FIG. 1, the reflective portion 24 is generally disposed about the core portion 14 and includes an inner periphery 26 and an outer periphery 28. The reflective portion 24 is generally configured to reflect light emitted by the light source 8. More particularly, in various embodiments, the reflective portion 24 is configured to reflect light that escapes through the outer periphery 22 of the core portion 14 between the first end 18 and second end 20 of the core portion 14. For example, in an illustrative embodiment, the light source 8 may include a plurality of light emitting diodes (LEDs) 8a positioned such that light emitted from the LEDs 8a enters the first end 18 of the core portion 14 of the light guide 12. Much of the light emitted may be transmitted through the body 16 of the core portion 14 and exit the second end 20 of the core portion 14; however, some of the light may escape through the outer periphery 22 of the core portion 14 between the first end 18 and the second end 20. The reflective portion 24 is configured to reflect at least some of the escaped light back into the core portion 14 of the light guide 12, such that the reflected light eventually exits the second end 20 of the core portion 14. The light exiting the second end 20 of the core portion 14 is contemplated to have been reflected multiple times within the light guide 12 before exiting the second end 20, in some instances.

As shown in FIG. 1, the reflective portion 24 may be disposed about the core portion 14 of the light guide 12 and extend along the length of the body 16 of the core portion 14. In some embodiments, the reflective portion 24 may extend along the outer periphery 22 of the core portion 14 from the first end 18 to the second end 20 of the core portion 14. In the light guide 12 illustrated in FIG. 1, the reflective portion 24 is contiguous with the core portion 14. In other words, the core portion 14 and the reflective portion 24 are in direct, abutting contact with one another. In various embodiments where the core portion 14 is contiguous with the reflective portion 24, the core portion 14 is fixedly coupled to the reflective portion 24 via integral forming of the core portion 14 and the reflective portion 24, as further described below. The reflective portion 24 may be formed of one or more of a variety of materials suitable for generally encasing the core portion 14 of the light guide 12 and reflecting light transmitted through the core portion 14. In various embodiments, the reflective portion 24 is semi-opaque and generally white in color. As such, in some embodiments, the semi-opaque nature of the reflective portion 24 may allow for small amounts of light to transmit through the outer periphery 28 of the reflective portion 24. It is contemplated that, in various embodiments, the reflective portion 24 may be formed of materials of various colors and opacities that are configured to reflect light.

Referring further to FIG. 1, the light guide 12 includes the absorptive portion 30. As shown in FIG. 1, the absorptive portion 30 is generally disposed about the reflective portion 24 and includes an inner periphery 32 and an outer periphery 34. The absorptive portion 30 is generally configured to absorb light emitted by the light source 8. More particularly, in various embodiments, the absorptive portion 30 is configured to absorb light that escapes the outer periphery 22 of the core portion 14 and, further, is transmitted through the reflective portion 24, such that the light escapes the outer periphery 28 of the reflective portion 24. In an illustrative embodiment, the light source 8 may emit light into the first end 18 of the core portion 14 of the light guide 12. Much of the light may be transmitted through the body 16 of the core portion 14 and exit the second end 20 of the core portion 14; however, some of the light may escape through the outer periphery 22 of the core portion 14 between the first end 18 and the second end 20. The reflective portion 24 is configured to reflect at least some of the escaped light back into the core portion 14 of the light guide 12, such that the reflected light eventually exits the second end 20 of the core portion 14. However, small amounts of light may be transmitted through the reflective portion 24 and may escape through the outer periphery 28 of the reflective portion 24. The absorptive portion 30, which is disposed generally about the reflective portion 24, is configured to absorb the light that escaped the core portion 14 and the reflective portion 24.

As shown in FIG. 1, the absorptive portion 30 may be disposed about the reflective portion 24 and may extend along a length of the reflective portion 24. In some embodiments, the absorptive portion 30 may extend along the outer periphery 28 of the reflective portion 24. In the light guide 12 illustrated in FIG. 1, the absorptive portion 30 is contiguous with the reflective portion 24. In other words, the outer periphery 28 of the reflective portion 24 and the inner periphery 32 of the absorptive portion 30 are in direct, abutting contact with one another. In various embodiments where the reflective portion 24 is contiguous with the absorptive portion 30, the reflective portion 24 is fixedly coupled to the absorptive portion 30 via integral forming of the absorptive portion 30 and the reflective portion 24, as further described below. The absorptive portion 30 may be formed of one or more of a variety of materials suitable for generally encasing the reflective portion 24 of the light guide 12 and absorbing light transmitted through the reflective portion 24. In various embodiments, the absorptive portion 30 is generally, substantially, majorly, and/or entirely opaque and generally black in color. As such, the absorptive portion 30 is configured to absorb light to a greater degree than the reflective portion 24 and the reflective portion 24 is configured to reflect light to a greater degree than the absorptive portion 30. It is contemplated that, in various embodiments, the absorptive portion 30 may be formed of materials of various colors that are configured to absorb light.

In further reference to FIG. 1, the absorptive portion 30 of the light guide 12 may include the attachment feature 36 configured to be engaged with a corresponding receiving feature 42 of the vehicle 40 for attachment of the light guide 12 to the vehicle 40. In the light guide 12 illustrated in FIG. 1, the attachment feature 36 extends outwardly from the absorptive portion 30. In other words, the attachment feature 36 protrudes further outward relative to the core portion 14 of the light guide 12 than other portions of the outer periphery 34 of the absorptive portion 30. It is contemplated that, in various embodiments, the attachment feature 36 may be one or more of a variety of features shaped and/or spaced relative to other portions of the outer periphery 34 of the absorptive portion 30 in at least one of a variety of ways that are configured to engage with the receiving feature 42 of the vehicle 40. For example, it is contemplated that the attachment feature 36 may be a recess in the outer periphery 34 of the absorptive portion 30 that is nearer to the core portion 14 than other portions of the outer periphery 34, in some embodiments.

In the light guide 12 depicted in FIG. 1, the attachment feature 36 is integrally coupled with the absorptive portion 30, such that the absorptive portion 30 and the attachment feature 36 are a single unitary body. The attachment feature 36 and the absorptive portion 30 may be integrally coupled as a result of being integrally formed of a consistent material, as is further described below.

As referenced above, the core portion 14, reflective portion 24, absorptive portion 30, and/or attachment feature 36, may be integrally formed in a single process to form a unitary light guide 12. By co-molding or extruding the core portion 14, reflective portion 24, absorptive portion 30, and/or attachment feature 36 in a single process, gaps between these portions of the light guide 12 are greatly reduced or altogether eliminated. The minimized gaps may reduce incidental light leakage from the light guide 12, and may eliminate the need for additional physical barriers or mating adjacent parts typically used to prevent light leakage in the prior art. In various embodiments, the core portion 14, the reflective portion 24, and/or the absorptive portion 30, though consisting of different materials, may be fixedly coupled to one another by a bond resulting from integral formation of the light guide 12 and substantially simultaneous cooling of the materials of the individual portions. As referenced above, the attachment feature 36 and the absorptive portion 30 may be formed of the same material, in various embodiments, and integrally coupled with one another to form a single unitary body. The attachment feature 36 being integrally coupled with the absorptive portion 30 may reduce or eliminate the need for additional structures for coupling the light guide 12 to the receiving feature 42. Further, the attachment feature 36 being defined by the outer periphery 34 of the absorptive portion 30 may enable this benefit without negatively impacting optical performance of the core portion 14 of the light guide 12.

It is contemplated that the light guide 12 may have other portions in addition to the core portion 14, the reflective portion 24, the absorptive portion 30, and the attachment feature 36 and, further, that the additional portions may be disposed between and/or outboard of the above-mentioned portions of the light guide 12. For example, it is appreciated that an additional layer of material may be applied to outer periphery 34 of the absorptive portion 30, in some embodiments.

Figure 2:
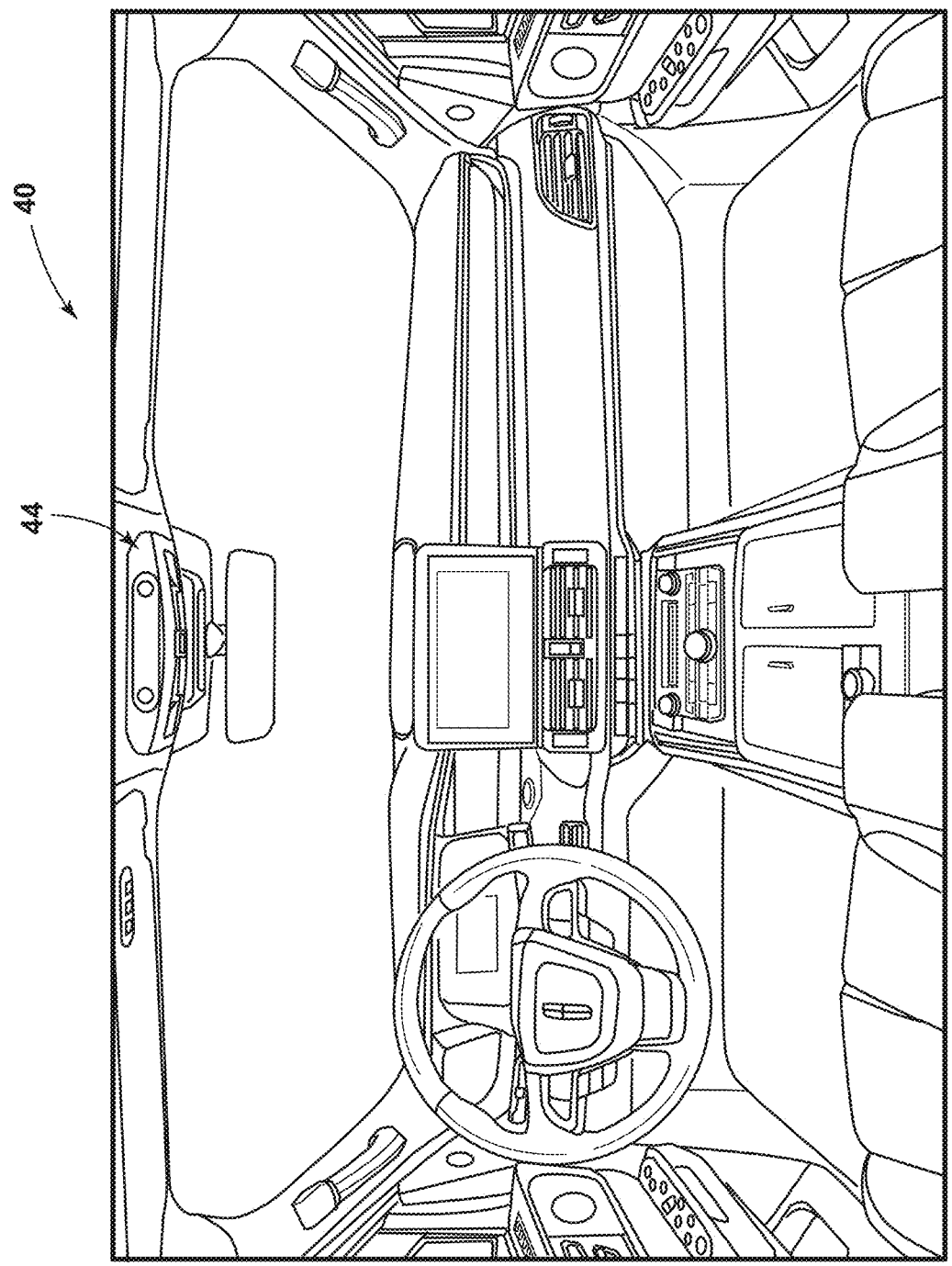
FIG. 2 is a perspective view of an interior of a vehicle, illustrating an overhead console within the vehicle interior, according to one embodiment.
Figure 3:
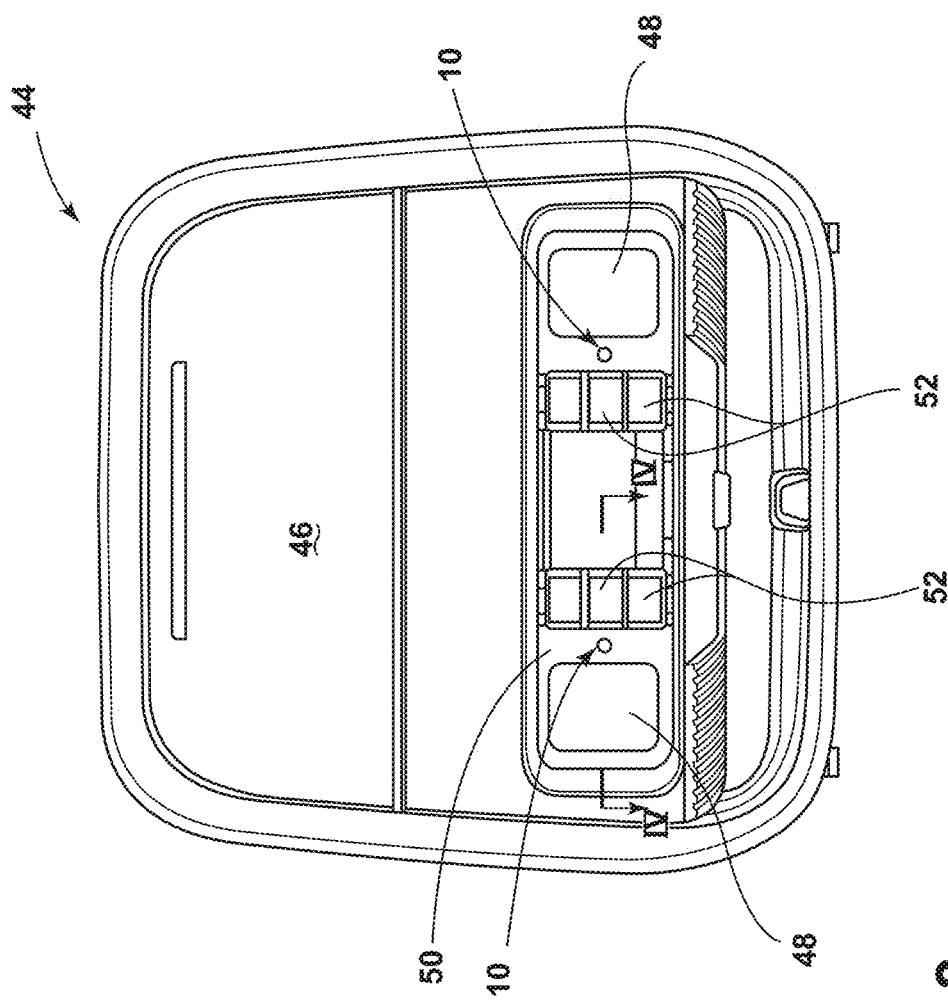
FIG. 3 is a front view of the overhead console of the vehicle, illustrating a portion of a lighting system coupled to the overhead console, according to one embodiment.
Figure 4:
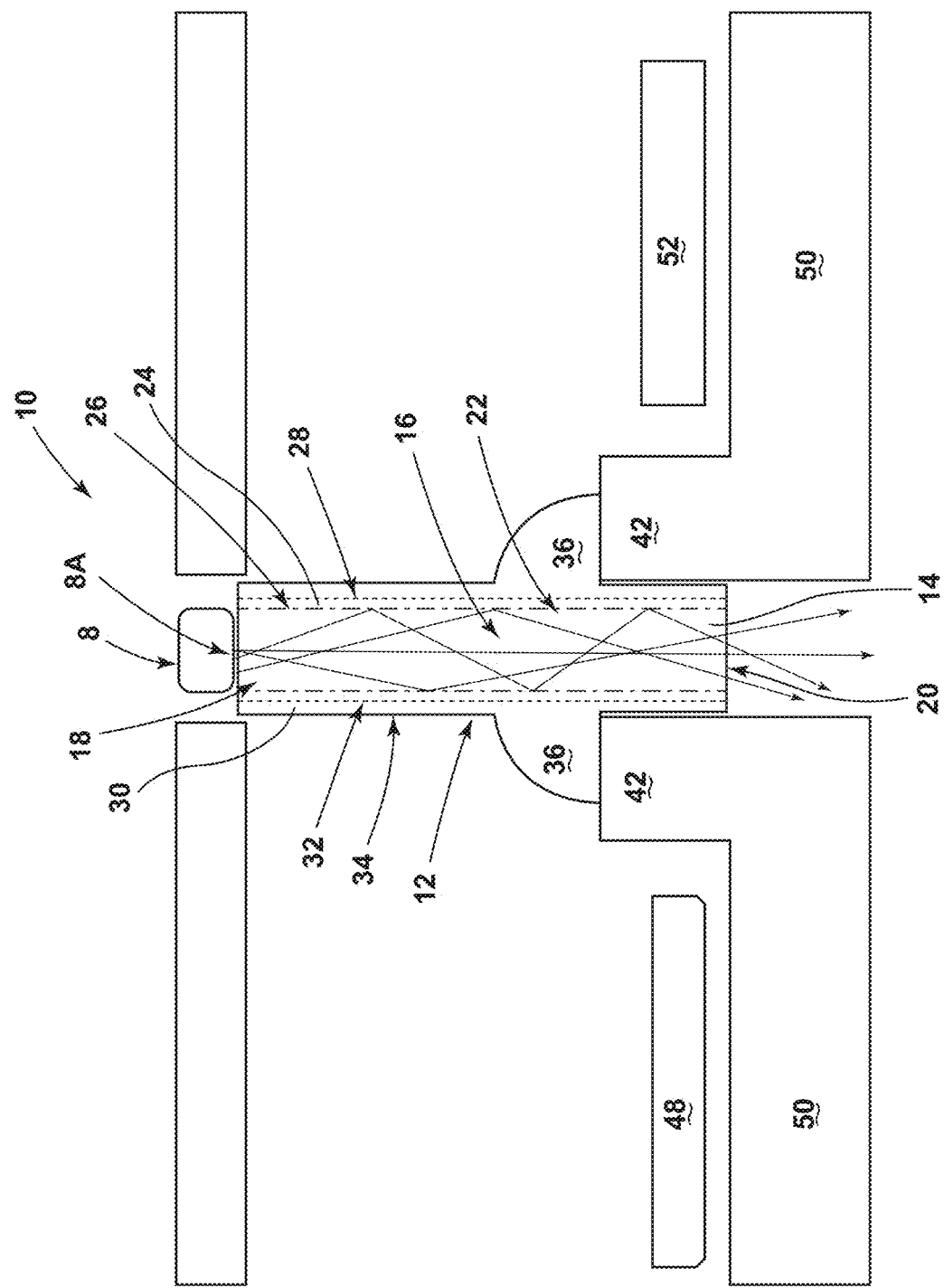
FIG. 4 is a cross-sectional view of the overhead console in FIG. 3 taken through line IV-IV, illustrating the light guide within the lighting system disposed in the overhead console, where the attachment feature of the light guide is engaged with a receiving feature of the overhead console, according to one embodiment.

A non-limiting example of an interior of the vehicle 40 is illustrated in FIG. 2. The depicted vehicle 40 includes an overhead console 44, which is shown in more detail in FIGS. 3 and 4. In the embodiment depicted in FIGS. 3 and 4, the overhead console 44 includes a sunglasses bin 46, a substrate 50 generally facing the interior of the vehicle 40, map light assemblies 48 coupled to the substrate 50 and configured to broadly emit light into the vehicle interior, a plurality of buttons 52 coupled to the substrate 50, and two non-limiting examples of the lighting system 10 configured to generally narrowly emit light into the interior of the vehicle 40. As shown in FIG. 4, the lighting system 10 includes the light guide 12, which is coupled to the overhead console 44 via engagement of the attachment feature 36 of the light guide 12 and receiving feature 42 of the overhead console 44. The light source 8 is disposed proximate to the light guide 12. More particularly, the light source 8 is disposed proximate to the first end 18 of the core portion 14 of the light guide 12. The light source 8 emits light into the core portion 14 of the light guide 12. The light is transmitted through the light guide 12 and exits through a physical and/or optical aperture in the substrate 50 of the overhead console 44 into the interior of the vehicle 40.

It is contemplated that the attachment feature 36 and the receiving feature 42 may be configured to engage with one another via one or more of a variety of corresponding engagement features (e.g., snap-fit, twist-lock, tongue and groove, etc.). Additionally, it is appreciated that the receiving feature 42 and the attachment feature 36 may be configured to securely engage with one another without the use of additional adhesives, in various embodiments. It is also contemplated that a variety of vehicle interior components (e.g., center console, glove box, dashboard, etc.) may include the receiving feature 42 and may be configured to house the lighting system 10.

Figure 5:
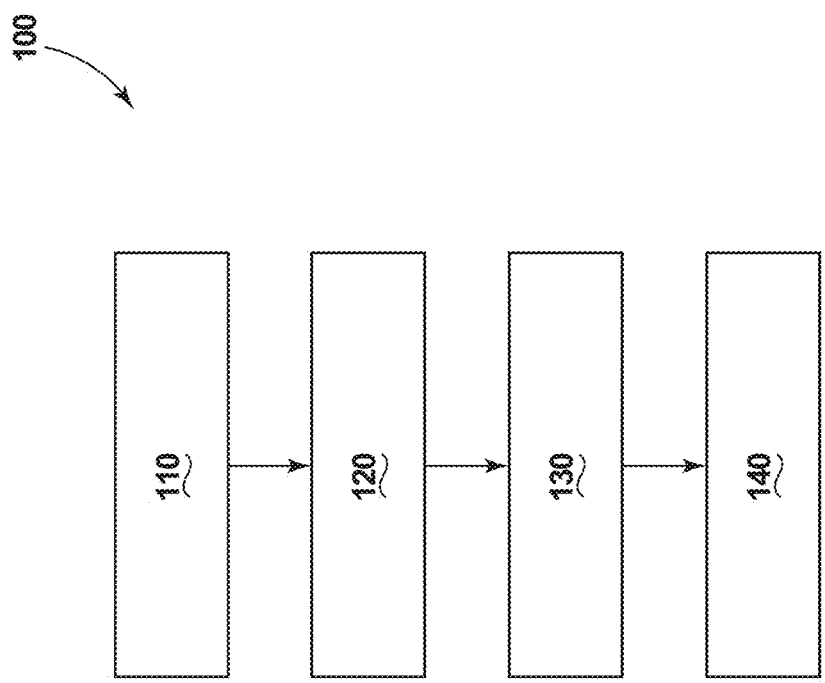
FIG. 5 is a block diagram illustrating the steps of a method of forming a light guide, according to one embodiment.

In reference to FIG. 5, a method 100 of forming a light guide 12 is shown. The method 100 of forming a light guide 12 includes the step 110 of forming the core portion 14 of the light guide 12. The core portion 14 may be formed of various materials that are substantially optically transparent and capable of transmitting visible light, as discussed above. In various embodiments, the core portion 14 of the light guide may be formed via molding or extrusion. For example, in some embodiments, the core portion 14 may be formed with other portions of the light guide 12 in a single process having multiple sequences via multi-shot injection molding. Further, in some embodiments, the core portion 14 may be formed with other portions of the light guide 12 in a single process having multiple sequences via co-extrusion. The core portion 14 formed includes the outer periphery 22 running along the body 16 from the first end 18 to the second end 20.

The method 100 of forming a light guide 12 further includes the step 120 of forming a reflective portion 24 of the light guide 12. In various embodiments, the reflective portion 24 may be formed about a length of the core portion 14. In some embodiments, the reflective portion 24 of the light guide 12 may be formed, such that the inner periphery 26 of the reflective portion 24 is contiguous with the outer periphery 22 of the core portion 14. The reflective portion 24 may be formed via molding or extrusion. For example, in some embodiments, the reflective portion 24 may be formed with other portions of the light guide 12, such as the core portion 14, in a single process having multiple sequences via multi-shot injection molding. Further, in some embodiments, the reflective portion 24 may be formed with other portions of the light guide 12 in a single process having multiple sequences via co-extrusion.

The method 100 of forming a light guide 12 further includes the step 130 of forming an absorptive portion 30 of the light guide 12. In various embodiments, the absorptive portion 30 may be formed about a length of the reflective portion 24 of the light guide 12. In some embodiments, the absorptive portion 30 may be formed such that the outer periphery 28 of the reflective portion 24 may be contiguous with the inner periphery 32 of the absorptive portion 30. The absorptive portion 30 formed includes the inner periphery 32 and the outer periphery 34. In some embodiments, the absorptive portion 30 may be formed such that the outer periphery 34 of the absorptive portion 30 defines the attachment feature 36. The defined attachment feature 36 may be configured to be engaged with the receiving feature 42 of the vehicle 40.

The absorptive portion 30 may be formed via molding or extrusion. For example, in some embodiments, the absorptive portion 30 may be formed with other portions of the light guide 12, such as the core portion 14 and the reflective portion 24, in a single process having multiple sequences via multi-shot injection molding. Further, in some embodiments, the absorptive portion 30 may be formed with other portions of the light guide 12 in a single process having multiple sequences via co-extrusion. In this way, the core portion 14, the reflective portion 24, and the absorptive portion 30, which may include and/or define the attachment feature 36, may be formed in a single process (e.g., molding, extrusion, etc.).

The method 100 of forming the light guide 12 may include the step 140 of solidifying the core portion 14, the reflective portion 24, and the absorptive portion 30 via cooling. In various embodiments, the method of forming the light guide 12 may entail heating various portions of the light guide 12 in order to shape the portions into defined forms. Once the heated portions of the light guide 12 have been shaped, the portions may be cooled for solidification. In some embodiments, the core portion 14, the reflective portion 24, and the absorptive portion 30 may be formed in a single process and cooled generally, substantially, majorly, and/or entirely simultaneously. This may aid in bonding the materials of the abutting portions of the light guide 12 to one another, which may result in the fixed integral coupling of the portions of the light guide 12. For example, in some embodiments, simultaneous cooling of the core portion 14, the reflective portion 24, and the absorptive portion 30 may cause the core portion 14 to be fixedly coupled to the inner periphery 26 of the reflective portion 24 and the absorptive portion 30 to be fixedly coupled to the outer periphery 28 of the reflective portion 24 in an integral manner.

The present disclosure provides a variety of advantages. First, the reflective portion 24 of the light guide 12 may reflect light that escaped the outer periphery 22 of the core portion 14 back into the core portion 14 of the light guide 12 for reduced light leakage and thus, low light loss. Second, the absorptive portion 30 may absorb light that escapes through the outer peripheries 22, 28 of both the core portion 14 and the reflective portion 24, which may further reduce undesired light leakage from the lighting system 10. Third, the integral formation of the core portion 14, the reflective portion 24, and the absorptive portion 30 may eliminate the need for adjacent light blocking structures separate from the light guide 12. Fourth, the attachment feature 36 may be integrally formed with the absorptive portion 30, which may eliminate the need for additional structures and/or adhesives that may generally be used for coupling light guides 12 to receiving features 42 of the vehicle 40. Fifth, the combined impact of the above-mentioned advantages may provide for a more aesthetically pleasing lighting system 10 within the vehicle 40, with reduced light leakage for a reduced cost, due to fewer necessary parts.

It is to be understood that variations and modifications can be made on the aforementioned structure without departing from the concepts of the present invention, and further, it is to be understood that such concepts are intended to be covered by the following claims unless these claims by their language expressly state otherwise.

What is claimed is:

1. A light guide for a vehicle, comprising:
   a core portion having a light transmissive body;
   a reflective portion disposed about the core portion along a length of the body;
   an absorptive portion disposed about the reflective portion along a length of the reflective portion; and
   an attachment feature extending outwardly from the absorptive portion and configured to be engaged with a corresponding receiving feature of the vehicle.

2. The light guide of claim 1, wherein the reflective portion is configured to reflect light to a greater degree than the absorptive portion, and the absorptive portion is configured to absorb light to a greater degree than the reflective portion.

3. The light guide of claim 2, wherein the reflective portion is contiguous with the core portion, and the absorptive portion is contiguous with the reflective portion.

4. The light guide of claim 3, wherein the core portion is fixedly coupled to the reflective portion and the absorptive portion is fixedly coupled to the reflective portion via integral forming of the core portion, the reflective portion, and the absorptive portion.

5. The light guide of claim 4, wherein the attachment feature is integrally coupled with the absorptive portion, such that the absorptive portion and the attachment feature are a single unitary body.

6. The light guide of claim 2, wherein the core portion is translucent.

7. The light guide of claim 6, wherein the absorptive portion is substantially opaque.

8. The light guide of claim 7, wherein the reflective portion is generally white and the absorptive portion is generally black.

9. A lighting system for a vehicle, comprising:
   a light guide, comprising:
      a core portion;
      a reflective portion disposed about the core portion; and
      an absorptive portion disposed about the reflective portion and defining an attachment feature;
   a light source proximate to the light guide and configured to emit light through the core portion; and
   a receiving feature coupled to the vehicle, wherein the reflective portion is configured to reflect the light emitted by the light source, the absorptive portion is configured to absorb light transmitted from the light source through the reflective portion, and the attachment feature is configured to be engaged with the receiving feature.

10. The lighting system of claim 9, wherein the reflective portion is contiguous with the core portion, and the absorptive portion is contiguous with the reflective portion.

11. The lighting system of claim 10, wherein the core portion is fixedly coupled to the reflective portion and the absorptive portion is fixedly coupled to the reflective portion via integral forming of the core portion, the reflective portion, and the absorptive portion.

12. The lighting system of claim 11, wherein the attachment feature is integrally coupled with the absorptive portion, such that the absorptive portion and the attachment feature are a single unitary body.

13. The lighting system of claim 9, wherein the core portion of the light guide has an elongated body that extends between a first end and a second end, and the light source is proximate to the first end.

14. The lighting system of claim 13, wherein the light source emits light into the first end of the core portion, such that the emitted light is transmitted through the elongated body of the core portion and out of the second end.

15. The lighting system of claim 14, wherein the reflective portion extends along an outer periphery of the elongated body of the core portion from the first end to the second end of the core portion.

16. The lighting system of claim 15, wherein the absorptive portion extends along an outer periphery of the reflective portion generally from the first end to the second end of the core portion.

17. A method of forming a light guide for a vehicle, comprising:
   forming a light transmissive core portion having an outer periphery;
   forming a reflective portion about a length of the core portion, the reflective portion having an inner periphery and an outer periphery; and
   forming an absorptive portion about a length of the reflective portion, the absorptive portion having an inner periphery and an outer periphery, the outer periphery of the absorptive portion defining an attachment feature configured to be engaged with a corresponding receiving feature of the vehicle.

18. The method of claim 17, wherein the core portion, the reflective portion, and the absorptive portion are integrally formed with one another in a single process having multiple sequences.

19. The method of claim 17, further comprising the step of:
   solidifying the core portion, the reflective portion, and the absorptive portion via substantially simultaneous cooling.

20. The method of claim 17, wherein the inner periphery of the reflective portion is contiguous with the outer periphery of the core portion, and the outer periphery of the reflective portion is contiguous with the inner periphery of the absorptive portion.

* * * * *